United States Patent [19]

Frings et al.

[11] Patent Number: 4,650,954

[45] Date of Patent: Mar. 17, 1987

[54] PROCESS FOR THE BUTT-WELDING OF ESPECIALLY DEEP-DRAWABLE STEEL SHEETS OR STEEL STRIPS GALVANIZED AT LEAST ON ONE SIDE

[75] Inventors: Adam Frings, Essen; Wilfried Prange, Dinslaken, both of Fed. Rep. of Germany

[73] Assignee: Thyssen Stahl AG, Duisburg, Fed. Rep. of Germany

[21] Appl. No.: 820,865

[22] Filed: Jan. 21, 1986

[30] Foreign Application Priority Data

Jan. 25, 1985 [DE] Fed. Rep. of Germany ....... 3502368

[51] Int. Cl.$^4$ ............................................. B23K 26/00
[52] U.S. Cl. .............................. 219/121 LD; 219/105; 219/121 FS; 219/161
[58] Field of Search ................ 219/121 LC, 121 LD, 219/121 FS, 161, 105

[56] References Cited

U.S. PATENT DOCUMENTS

| | | | |
|---|---|---|---|
| 1,773,068 | 8/1930 | Vienneau | 219/105 |
| 2,852,660 | 9/1958 | Maloney | 219/161 X |
| 3,535,489 | 10/1970 | Hinrichs | 219/121 EC |
| 3,881,084 | 4/1975 | Baardsen | 219/121 LD |
| 3,909,582 | 9/1975 | Bowen | 219/121 LM X |
| 4,000,392 | 12/1976 | Banas et al. | 219/121 LC |
| 4,417,125 | 11/1983 | Tsutsumi | 219/121 FS X |

FOREIGN PATENT DOCUMENTS 0098306 1/1984 European Pat. Off. .
0117751 9/1984 European Pat. Off. .

*Primary Examiner*—C. L. Albritton
*Attorney, Agent, or Firm*—Sprung Horn Kramer & Woods

[57] ABSTRACT

A process for the butt-welding of especially deep-drawable steel sheets or steel strips galvanized at least on one side, in which the welding seam is protected against corrosion. To obtain a welding seam flush with the sheet and protected against corrosion, without the reworking of the welding seam and without the use of filler material, sheets or strips having essentially rectangular cut edges with a corrosion in the longitudinal direction of at most 0.4 mm are used. The sheets and strips brought into touch contact with these cut edges are melted in the region of the welding joint by means of a laser beam, of which the focal spot covering the cut edges has a diameter of at most 0.2 mm. Because of the extremely narrow welding gap, the voids are filled by the molten material of the adjacent sheets, without any detectable reduction in the thickness of the sheets or strips. Furthermore, the welding seam is protected against corrosion as a result of the long-range protection effect exerted by the zinc of the adjacent regions.

6 Claims, 2 Drawing Figures

PROCESS FOR THE BUTT-WELDING OF ESPECIALLY DEEP-DRAWABLE STEEL SHEETS OR STEEL STRIPS GALVANIZED AT LEAST ON ONE SIDE

BACKGROUND OF THE INVENTION

1. Field of the Invention

The invention relates to a process for the butt-welding by means of a laser beam of especially deep-drawable steel sheets or steel strips galvanized at least on one side and having essentially rectangular cut edges, in which the welding seam is protected against corrosion.

Fabricators of galvanized sheets require for specific purposes, for example for molding plates to be produced by deep-drawing, sheets which have a width for which currently available galvanizing plants are not designed. They have therefore resorted to butt-welding two or more sheets together. The production of such sheets by conventional butt-welding methods makes it necessary to rework the welding seam, because it is impossible to obtain a welding seam flush with the sheet and suitable for further processing (deep-drawing), and because there is no corrosion protection in the region of the welding seam. In particular, in the conventional processes, irregularities occur in the thickness of the welding seam. Sheets produced in this way were unsuitable for direct further processing into shaped articles by deep-drawing or pressing, because such sheets damage the tool or the shaping operation cannot be carried out with the necessary accuracy.

2. Discussion of Prior Art

In one of the known processes for the butt-welding of galvanized sheets, the welding seam is made by means of an electron beam, with filling material (welding wire) being added. To obtain a quality suitable for further processing, it was necessary to level off the welding seam by means of grinding. Furthermore, in electron-beam welding, a zone without corrosion protection is obtained not only in the region of the welding seam, but also in relatively wide regions next to the welding seam, because the zinc evaporates owing to the high welding temperature. It is therefore necessary, after welding, to provide not only the welding seam, but also the regions stripped of zinc with a corrosion-proof coating. Measures of this type are merely expedients and do not satisfy the fabricators who require a sheet-metal plate protected against corrosion over its entire surface and suitable for deep-drawing.

In another known process for the butt-welding of galvanized sheets and strips by means of a laser beam, the essentially rectangular cut edges are purposely brought to a specific distance from one another, thus producing a continuous welding gap which is filled with molten additive material (welding wire) (EP-A Nos. 0,098,306 and 0,117,751). Such a process, as compared with a butt-welding process by means of an electron beam, is characterized in that the laser beam can be directed more accurately. In this process, therefore, only the welding wire, which can have a larger or smaller diameter than the welding joint, is subjected directly to the laser beam. Consequently, the sheets to be welded to one another are melted only by means of the welding heat of the molten welding wire. The disadvantage of this process is that it produces a relatively wide raised welding seam without corrosion protection, which has to be made flush with the sheet by means of mechanical surface working and which consequently has to undergo protection treatment.

SUMMARY OF THE INVENTION

The object on which the invention is based is to provide, from at least two galvanized sheets or strips by means of butt-welding, with the least possible outlay, a wider, especially deep-drawable sheet or strip, the surface of which is plane and corrosion-proof even in the region of the welding seam.

In a process for butt-welding by means of a laser beam of steel sheets or steel strips galvanized at one side and having essentially rectangular cut edges, in which the welding seam is protected against corrosion, this object is achieved by making cut edges with a corrugation in the longitudinal direction of at most 0.04 mm on the sheets or strips, and by bringing the sheets or strips into touch contact with these cut edges and then welding them to one another by means of the laser beam which has a focal spot covering the cut edges of a diameter of at most 0.2 mm.

In the process according to the invention, the welding produces directly not only a welding seam essentially flush with the sheet, but also a corrosion-proof welding seam. It is therefore unnecessary either to level off the welding seam by reworking after welding or to provide it with corrosion protection subsequently. The use of laser beam guarantees that the direct supply of heat is restricted to a very narrow region, with the result that there remains only a very narrow zinc-free zone which is corrosion-proof because of the long-range protection effect, known per se, exerted by the zinc of the regions adjacent on both sides. Since the welding joint over its entire length has a maximum width of $2 \times 0.04$ mm at most at a few points, the process according to the invention makes do without additive material (filler wire). The quantity of material required to fill the remaining extremely small holes and provided by the adjacent zones of the sheets hardly reduces at all the thickness of the sheet which is thicker than the gap by a power of ten. For the further processing of the sheet, this means that it can be shaped for deep-drawing or pressing without mechanical reworking. As regards the use of the sheet, it means that, in comparison with a sheet protected against corrosion by means of a uniform zinc coating, it has no disadvantages as regards corrosion protection because of the long-range protection effect exerted by the zinc on the zinc-free welding seam. The advantage of the process according to the invention for the manufacturer is that, without too high an outlay, he can produce, from the sheets or strips supplied by his conventional galvanizing plants, sheets or strips of multiple width without any loss of quality in the region of the welding seams.

To keep the influence of heat on the zinc layer in the edge zones of the welding seam as low as possible, in an embodiment of the invention the sheets or stips are cooled on both sides of the welding seam. Cooling can be carried out, for example, by blowing on cooling gas. Especially good heat protection is obtained if the sheets to be welded together are clamped along the entire welding gap in clamping jaws which are made of thermally conductive material, such as, for example, copper, and which, if appropriate, are cooled by means of a cooling fluid circulating inside them. To achieve good cooling of the sheet surface and flatness of the sheet, it is advantageous if the clamping jaws engage on the sheet at a distance of 5 to 10 mm from the welding gap.

This ensures that the sheet material is melted solely in the region of the focal spot, and the liquid material solidifies again immediately, as soon as it escapes the focal spot of the laser beam.

Good cooling is particularly important for the underside of the sheet, because it is necessary to prevent the molten material from flowing out of the welding joint. An outflow can be effectively prevented if the parts of the clamping jaws arranged under the sheet are subjected to especially intensive cooling.

It has proved advantageous to use, underneath the sheets to be welded together, a clamping device which bridges the welding joint and which has in the region of the welding joint a deep groove, into which inert gas can be blown to maintain the welding seam under an inert-gas atmosphere. This not only prevents the oxidation of the welding material, but also assists the cooling of the sheet underside. Furthermore, an excess gas pressure in this groove counteracts the outflow of molten material from the welding joint.

DESCRIPTION OF TWO EMBODIMENTS OF THE INVENTION

DETAILED DESCRIPTION OF THE EMBODIMENT OF THE INVENTION

The process according to the invention is suitable for the butt-welding of thin sheet metal, especially within a thickness range of 0.5 to 1.5 mm. The essentially rectangular cut edges are to have a corrugation of at most 0.04 mm over their length. If such sheets are brought into touch contact for butt-welding, the maximum distance between them at individual points can be 0.08 mm at most.

Figure 1:
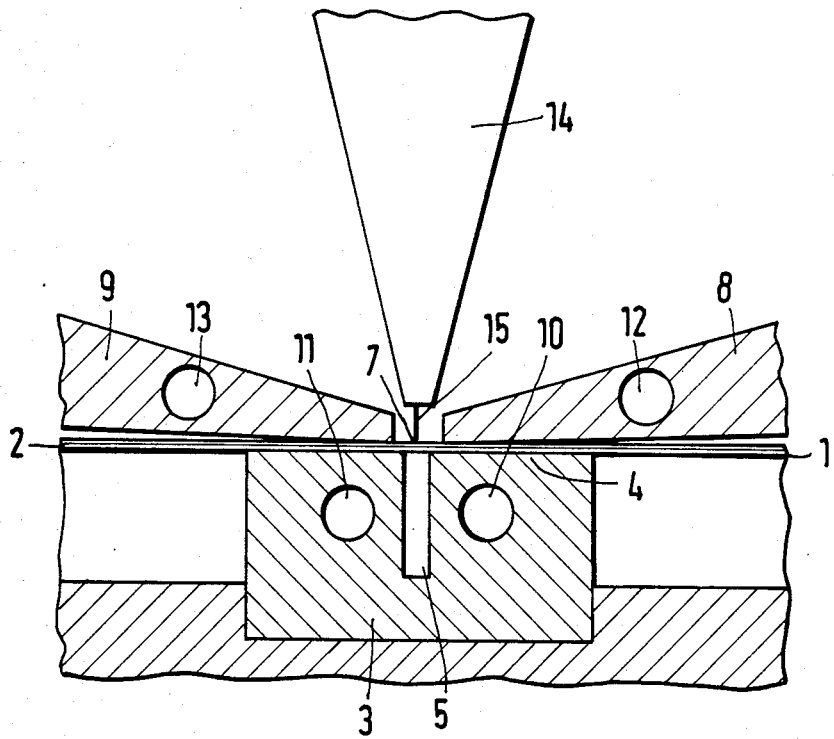
FIGS. 1 and 2 show similar means for butt-welding during the process in cross-section.

In the exemplary embodiment of FIG. 1, the sheets 1,2 to be butt-welded to one another lie in touch contact on a base 3 with a plane supporting surface 4. A longitudinal groove 5 open towards the supporting surface 4 is provided in the base 3. The essentially rectangular edges 7, to be welded to one another, of the sheets 1,2 are located in the region of this longitudinal groove 5. The sheets 1,2 are pressed against the base 3 by means of clamping jaws 8,9 and are thus held fixed. Both the base 3 and the clamping jaws 8,9 have channels 10 to 13, through which a coolant is conveyed. Inert gas is passed into the longitudinal groove 5 closed off at the top by the sheets 1,2 and likewise cools and generates a certain excess pressure in the longitudinal groove 5.

A laser gun 14 with a laser beam 15 directed onto the welding joint is movable in the longitudinal direction over the welding joint 7. The laser beam 15 has a focal spot of a diameter of at most 0.2 mm. This focal spot is directed onto the center line of the welding joint 7.

The travelling speed of the laser gun 14 over the welding joint 7 and the welding energy transmitted to the welding joint depend, above all, on the thickness of the sheets 1,2. For example, on galvanized steel sheets with a thickness of 0.8 mm, a distance between the cooled copper clamping jaws 8,9 and the center of the welding joint 7 of 3 mm and a focal spot of the laser beam of a diameter of less than 0.2 mm, good results are obtained with a travelling speed of the laser gun 14 over the welding joint of 2 m/min. The energy transmitted at the same time is then approximately 375 L J/cm. The welding seam obtained in this way is faultless both in terms of corrosion protection and in terms of mechanical properties (elongation, strength), so that the sheet can be shaped without difficulty even in the region of the welding seam.

Figure 2:
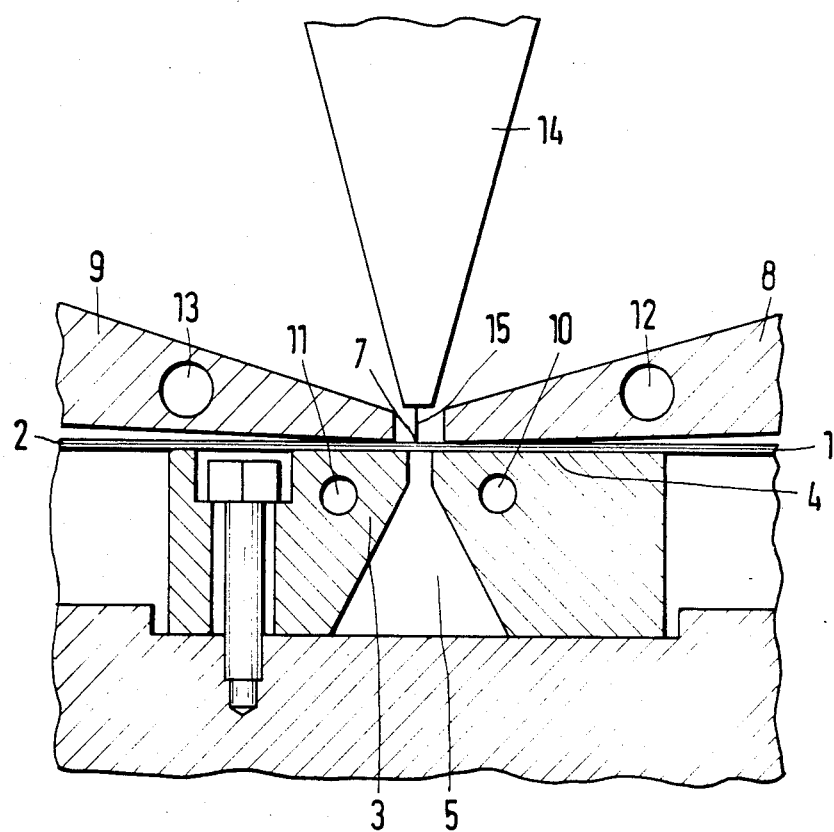

The exemplary embodiment of FIG. 2 differs from that of FIG. 1 only in the design of the base which, in this case, is not bridge-like, but divided in two. The individual parts are screwed to a support. The purpose of the downward funnel-like widening of the longitudinal groove is to prevent splashes from being deflected towards the welding seam.

What is claimed is:
1. A process for the butt-welding by means of a laser beam of steel sheets or steel strips galvanized at least on one side and having essentially rectangular cut edges, in which the welding seam is protected against corrosion, wherein the cut edges with a corrugation in the longitudinal direction of at most 0.04 mm are made on the sheets or strips, and the sheets or strips are brought into touch contact with these cut edges and then welded to one another by means of the laser beam which has a focal spot covering the cut edges of a diameter of at most 0.2 mm.

2. A process as claimed in claim 1, wherein the sheets or strips to be welded to one another are cooled during welding on both sides of the welding seam and over its entire length, in such a way that the zone influenced by the welding has a width of less than 1 mm.

3. A process as claimed in claim 1, wherein the sheets or strips are cooled on both sides.

4. A process as claimed in claim 1, wherein the welding seam is maintained under a protective gas atmosphere on the rear side.

5. A process as claimed in claim 1, wherein the welding joint is subjected to excess pressure on the rear side (underside).

6. A process as claimed in claim 1, wherein the sheets to be welded to one another are held in position during welding by means of cooled welding jaws which engage immediately next to the welding joint.

* * * * *